UNITED STATES PATENT OFFICE.

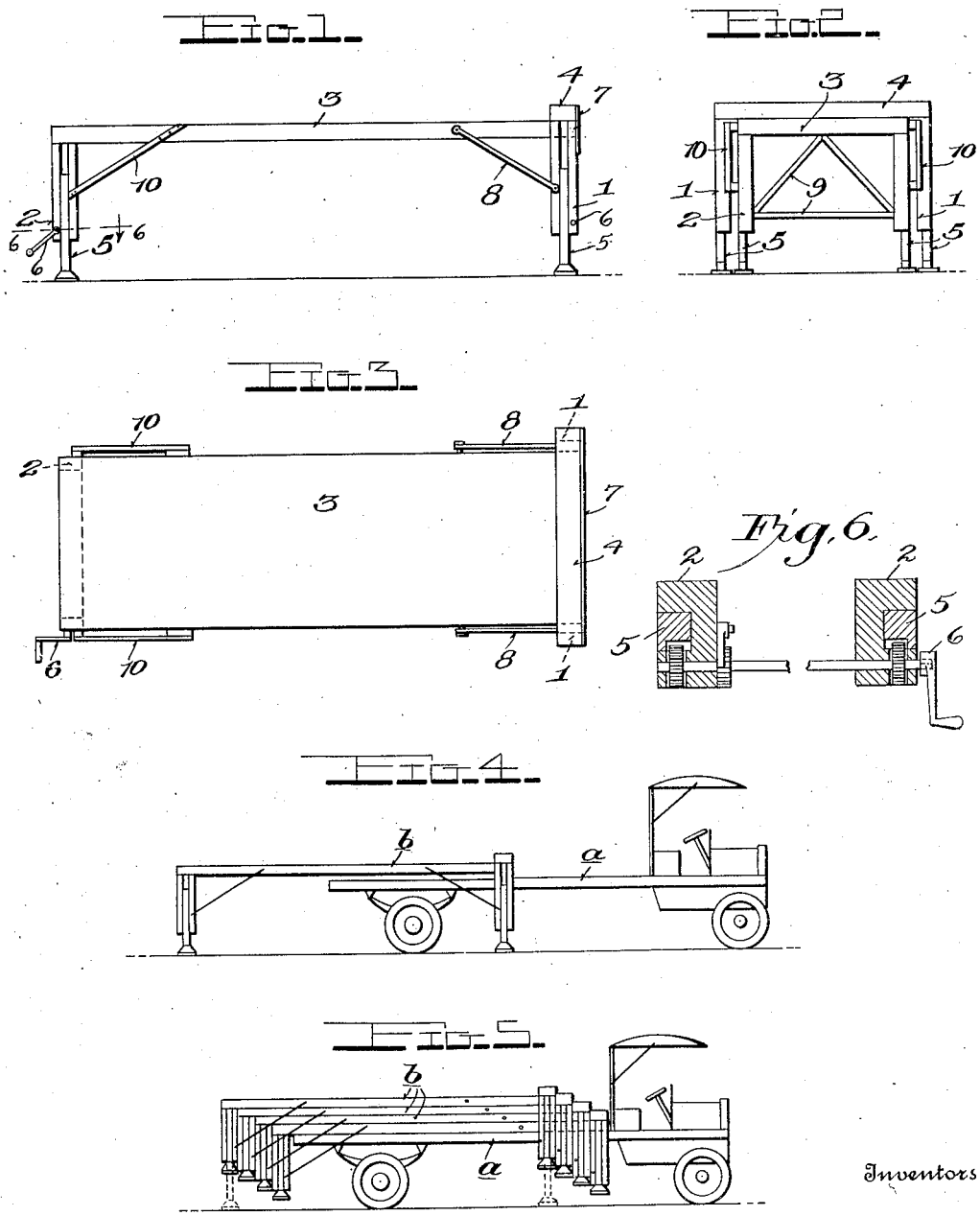

CARLOS MARIA CALATAYND AND ALBERTO LODIEN, OF BUENOS AIRES, ARGENTINA.

TRANSPORTING MEANS.

1,329,956.  Specification of Letters Patent.  Patented Feb. 3, 1920.

Application filed July 9, 1919. Serial No. 309,774.

*To all whom it may concern:*

Be it known that we, CARLOS MARIA CALATAYND and ALBERTO LODIEN, citizens of the Argentine Republic, residing at Reconquista street 195 and Villa Ballester, Buenos Aires, Argentina, have invented certain new and useful Improvements in Transporting Means, of which the following is a specification.

This present invention relates to certain new and useful improvements in transporting means and has for its object to provide transporting vehicles of any kind with interchangeable multiple platforms by which said vehicles are rendered capable of multiple service as will be hereinafter explained.

Further objects of this present invention will be apparent from the following description.

In order that the invention may be clearly understood and easily carried into practice, it has been illustrated in the accompanying diagrammatical drawings which show an embodiment of the same.

In the said drawings:

Figure 1 is a side elevation of a platform according to this invention.

Fig. 2 is a rear elevation of the same.

Fig. 3 shows a plan of the said platform.

Fig. 4 shows diagrammatically the loading and unloading of a platform on a motor truck and Fig. 5 illustrates the motor truck loaded with a series of four platforms according to this present invention.

Fig. 6 is an enlarged horizontal section on line 6—6 of Fig. 1, showing one form of device for operating the adjustable feet of the platform supports.

Similar characters of reference point out to same or like parts throughout the above figures.

As will be seen from Figs. 1 to 3, the platform consists of a flooring 3 of any suitable material and having a strength sufficient for the load to be supported. Said flooring is provided with two pairs of supporting legs 1 and 2, the front legs 1 being preferably fixed to reinforced extensions 4 at the front edge of the platform as may be seen from the above figures. Each of the said four legs is provided with extensible means, such as an adjustable foot 5 or any other equivalent device. In this present embodiment, the feet 5 are operated by rack-and-pinion devices which are themselves actuated by means of hand levers 6 fitted to certain of the legs, although it is obvious that any other actuating means may be used independently of the invention. The operating means may also act on any one of the feet individually or on all four feet together. 7, 8, 9 and 10 are brace rods or the like of which any suitable number may be used so as to give the required resistance to the frame.

The diagrams in Figs. 4 and 5 show the platforms as actually used in combination with a motor truck. It is obvious that the same appliance may be used in connection with horse-drawn trucks or any other transporting vehicle.

*a* is the flooring of the truck which preferably covers the rear wheels of the vehicle. The said flooring need not be a continuous one and may be substituted by a frame of any suitable form. The interchangeable platforms *b* are placed one upon the other on the said flooring *a*, preferably stepwise on account of the front legs 1. The length of the legs and their supporting feet is so calculated that when they are not in their extended position, the lower ends of the feet of the lowermost platform on the truck do not reach the ground.

The loading and unloading of the platforms on the truck is effected as follows. The platform is raised by its extensible means so that it may rest directly on the ground and the truck then advances from the platform and leaves it standing on itself or runs back under the platform as may be easily understood from Fig. 4.

It then becomes possible for a single transporting truck to effect a multiple service, as it may carry any suitable number of unloaded platforms *b* to the place or places in which they are to be loaded and leave them by themselves while they are loaded. In this manner a considerable time saving is obtained, as the trucks need not be inactive during the loading and unloading operations.

It is obvious that many constructive and other alterations may be introduced in the improved device of this present invention without departing from the scope of the same as subsequently claimed.

What we claim is:

A loading platform, comprising an elongated, substantially rectangular flooring; front and rear pairs of vertical legs supporting said flooring at the corners thereof, each leg including a movable foot which is adjustable endwise longitudinally of the leg in either direction to raise or lower the flooring from or toward the ground, so as to permit a truck to be run beneath the flooring while supported upon the ground by said feet, and the latter thereafter drawn up above the ground to cause the flooring to rest upon and be supported wholly by the truck, and also to permit said feet to ultimately be lowered against the ground in order to raise the flooring above the truck and enable said truck to be withdrawn from beneath said flooring, leaving the flooring again supported upon the ground wholly by said feet; and operating devices for adjusting said feet.

In testimony whereof we affix our signatures in the presence of a witness.

CARLOS MARIA CALATAYND.
ALBERTO LODIEN.

Witness:
F. G. FORENSAL.